United States Patent Office 3,032,597
Patented May 1, 1962

3,032,597
CHLOROFLUOROCARBONS
Hugh Leithead Roberts, Northwich, England, assignor to Imperial Chemical Industries Limited, London, England, a corporation of Great Britain
No Drawing. Filed June 2, 1960, Ser. No. 33,383
Claims priority, application Great Britain July 27, 1960
7 Claims. (Cl. 260—653)

This invention relates to a novel process for making halogen-substituted hydrocarbons, particularly those containing chlorine and fluorine together in the same molecule.

Known methods for making chlorofluorocarbons require the use of anhydrous hydrogen fluoride at one stage and this is often a cause of difficulties in operation connected with handling, corrosion and cost.

We have now found a method of making chlorofluorocarbons which dispenses with the need for anhydrous hydrofluoric acid.

According to our invention we provide a process for making chlorofluorocarbons comprising reacting chlorine with a mixture of a metal carbide and a metal fluoride at elevated temperature.

Metal carbides that may be used include those of calcium, aluminium and iron. Metal fluorides suitable for the process include those of sodium and potassium, calcium, strontium and barium. The fluoride is the source of the fluorine and the carbide the source of the carbon in the chlorofluorocarbons, and the general reaction considered as a whole may be exemplified by the equation

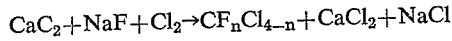

$$CaC_2 + NaF + Cl_2 \rightarrow CF_nCl_{4-n} + CaCl_2 + NaCl$$

Convenient reaction temperatures lie within the range 350°–500° C., and if the reaction is carried out in a closed vessel it may be under an autogenous pressure of up to 20 atmospheres. Pressure is not however necessary, since the reaction may also be brought about in a continuous-flow system at atmospheric pressure, for example in a rotating tube heated in a suitable furnace. It is important to use dry materials in order to avoid side reactions involving the metal carbide, and the latter as well as the metal fluoride are preferably ground finely in a ball mill beforehand to provide as much surface-area as possible for contact with the chlorine.

The reaction yields a mixture of chlorofluorocarbons, mostly chlorofluoromethanes, from which individual compounds may be separated by means of gas-chromatography using for example a column of firebrick impregnated with dibutyl phthalate.

The process is illustrated by the following examples.

*Example 1*

Commercial calcium carbide (6.4 g.) and dry sodium fluoride (42.0 g.) which had been ground and mixed together in a ball mill were placed in a 500-ml. nickel autoclave and dry chlorine (43.5 g.) condensed into the vessel by cooling with liquid air. The autoclave was sealed and kept at 400° C. for 1 hour. The volatile products after washing with a sodium hydroxide solution and drying over phosphorus pentoxide weighed 1.5 g. These products after separation by gas chromatography and identification by infra-red spectroscopy were found to include chlorotrifluoromethane, dichlorodifluoromethane, trichlorofluoromethane and 1:2-dichlorotetrafluorothane in amounts corresponding to yields of respectively 2.6%, 3.4%, 0.9% and 0.6% based on the calcium carbide present initially.

*Example 2*

In this example a stream of chlorine gas was passed through a heated, agitated mixture of calcium carbide and sodium fluoride. The reaction vessel was a 4 ft. x 4 inch nickel tube closed at each end except for provision for the entrance and exit of a gas stream, and capable of being continuously rotated within an electric furnace. In it was placed commercial calcium carbide (56 g.) and dry sodium fluoride (146 g.) which had been previously powdered finely and mixed together by ball milling. The tube was heated to 455° C. and rotated to ensure good contact between the solid reactants and the chlorine. Dry chlorine was passed into the tube at a rate of 13.0 g. per hour for 30 hours. The issuing gases were passed into a scrubber containing sodium hydroxide solution to remove unchanged chlorine and any by-product carbon dioxide and then collected in traps cooled by liquid air. After drying over phosphorus pentoxide the volatile products so obtained (3.8 g.) were separated by gas-chromatography and identified by infra-red spectroscopic examination as chlorotrifluoromethane and dichlorodifluoromethane in amounts corresponding to yields of 1.4% and 1.3% respectively, based on the calcium carbide present initially.

*Example 3*

Finely powdered aluminium carbide (1.2 g.) and dry sodium fluoride (21.5 g.) were thoroughly mixed together, placed inside a 370-ml. nickel reaction vessel and dry chlorine (10 g.) condensed in. The vessel was sealed, placed in an electric furnace, and kept at 425° C. for 1 hour. The volatile products, after washing with sodium hydroxide solution and drying over phosphorus pentoxide, weighed 1.0 g., and were shown by infra-red spectroscopy and quantitative gas-chromatography to consist of chlorotrifluoromethane 5%, dichlorodifluoromethane 49.5%, and trichlorofluoromethane 45.5% by volume, which represents yields of 1.6%, 16%, and 14.1% respectively based on aluminium carbide.

*Example 4*

Finely powdered aluminium carbide (7.2 g.) and dry sodium fluoride (84 g.) were thoroughly mixed together and placed in a 500-ml. nickel autoclave. Dry chlorine (43.4 g.) was condensed into the vessel by cooling it with liquid air. The vessel was sealed and kept at 390° C. for 1½ hours by means of an electric furnace. The volatile products were treated with mercury to remove unchanged chlorine, washed with sodium hydroxide solution, and dried over phosphorus pentoxide. They (3.2 g.) were then examined by infra-red spectroscopy and quantitative gas-chromatography and found to contain carbon tetrachloride 5%, chlorotrifluoromethane 5%, dichlorodifluoromethane 21.5%, and 1:2-dichlorotetrafluoroethane 2% by volume, representing yields of these materials of respectively 1.3%, 13.3%, 2.9% and 0.8% based on aluminium carbide.

What I claim is:
1. A process for the production of chlorofluorocarbons comprising reacting chlorine with a mixture of a carbide of a metal selected from the group consisting of calcium, aluminum and iron and a fluoride selected from the group consisting of alkali and alkaline earth fluorides.

2. A process as set forth in claim 1 in which the fluoride is sodium fluoride.

3. A process as set forth in claim 1 in which the fluoride is potassium fluoride.

4. A process as set forth in claim 1 in which the fluoride is an alkaline earth fluoride.

5. A process as set forth in claim 1 in which the temperature is within the range 350° to 500° C.

6. A process for making chlorofluoromethanes comprising reacting chlorine with a mixture of aluminum carbide and sodium fluoride at a temperature between 350° and 500° C.

7. A process for the production of chlorofluoromethanes comprising reacting chlorine with a mixture of calcium carbide and sodium fluoride at a temperature between 350° and 500° C.

References Cited in the file of this patent

UNITED STATES PATENTS

| | | |
|---|---|---|
| 2,709,184 | Muetterties | May 24, 1955 |
| 2,709,185 | Muetterties | May 24, 1955 |